United States Patent Office 2,849,474
Patented Aug. 26, 1958

2,849,474

ALKYLARYL THIO-URETHANS

Herman S. Bloch, Chicago, Ill., and Donald R. Strehlau, Drexel Hill, Pa., assignors to Universal Oil Products Company, Des Plaines, Ill., a corporation of Delaware No Drawing. Application September 1, 1954
Serial No. 453,700

18 Claims. (Cl. 260—455)

This application is a continuation-in-part of our co-pending application Serial No. 182,403, filed August 30, 1950, now Patent No. 2,695,913.

The present invention relates to a process for the manufacture of alkylaryl thio-urethans and to novel compositions of matter containing such urethan derivatives which have surface-active and other useful properties. One of the outstanding applications of these products concerns their use as surface active agents and detergents, either individually or in combination with other compounds having surface active properties.

In accordance with well-established principles concerning the phenomenon of detergency exhibited by certain compounds in aqueous solution, the selection of a suitable compound which will exhibit such properties depends upon the choice of the proper chemical groups which when integrated into the structure of an organic compound will provide a critical balance of the hydrophilic and hydrophobic groups in the molecule, so that the compound is capable of orientation in a solution of the compound in an appropriate solvent with other molecules of the compound to form a detergent micelle. The present inventon concerns substantially non-ionic surface-active compounds in which the hydrophilic group is a water-solubilizing polyoxypolyalkylene substituted thio-urethan linkage, and the hydrophobic group is an alkyl-substituted mono- or bicyclic hydrocarbon radical in which the alkyl substituent contains at least three, up to about 20 carbon atoms per group, depending upon the relative water-solubilizing capacity of the urethan group as against the hydrophobic activity of the hydrocarbon radical attached to the thio-urethan linkage. The compounds of this invention in general correspond to the following structural formula:

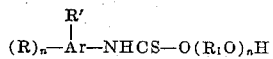

wherein Ar is a cyclic hydrocarbon radical selected from the mono- and bicyclic aromatic hydrocarbons, R' is an alkyl group containing from 3 to 20 carbon atoms, R is an alkyl group containing from 1 to 3 carbon atoms, $R_1$ is the non-functional residue of a polyhydroxy organic compound, and $n$ is a whole number having a value from 1 to 50. The group comprising the polyoxyalkylated thio-urethan linkage which tends to solubilize the product in water is a thiocarbamic acid derivative of an hydroxy compound, represented, for example, by the monomeric glycols, glycol mono-ethers and mono-esters, the polyoxyalkylene glycols, and their mono-ethers and mono-esters, and other organic compounds containing, besides other substituents, at least two hydroxyl groups per molecule, such as the simple monosaccharide sugars of the pentose and hexose series, the disaccharide sugars, the polymeric hexoses, such as starch, and partially esterified or etherified polyhydroxy compounds, including derivatives of glycerol, pentaerythritol, dipentaerythritol, 1,1,1-trimethylolethane, and the like. In specifying thio-urethans herein, it is intended that such term designate compounds which contain the group: —NHCS—O—, being the hydroxy esters of thiocarbamic acid.

One object of this invention is to provide a novel class of compounds certain members of which have surface-active properties in aqueous solutions thereof, while other derivatives possess surface-activity in non-aqueous, organic solutions.

Another object of this invention is to provide a solid detergent product which may be molded in the form of bars and which has the desirable lathering and muci-laginous properties of soap, but which, on the other hand, unlike soap, does not precipitate a curd when used in hard water containing calcium and magnesium ions in solution or in sea water.

A further object of the invention is to prepare a non-ionic, liquid surface-active agent soluble in water and compatible with cationic, anionic, or other non-ionic surface-active agents, and with builder salts, water softeners, etc.

Still another object of this invention is to prepare a non-ionic surface-active agent soluble in oleaginous media such as hydrocarbon and vegetable oils and other organic solvents.

One embodiment of the invention concerns an N-(alkyl-aryl hydrocarbon substituted) thio-urethan having an alkyl substituent on the aryl nucleus containing from about 3 to about 20 carbon atoms, said thio-urethan being the thio-carbamic acid ester of a polyhydroxy organic compound.

Another embodiment of this invention concerns a process for the manufacture of an alkyl-substituted cyclic hydrocarbon urethan which comprises reacting thio-compound (1) with compound (2), said compound (1) consisting of a mono-(alkylcyclic hydrocarbon)-substituted isothiocyanate in which the alkyl-cyclic hydrocarbon group is substituted on the thiocyanate nitrogen atom and is selected from the mono- and bicyclic aromatic hydrocarbon radicals containing a single alkyl substituent on the aryl nucleus having from 3 to about 20 carbon atoms and said compound (2) is a polyoxyorganic compound selected from the group consisting of a poly-(oxyalkylene) glycol, a poly-(oxyalkylene) glycol ether, a poly-(oxyalkylene) glycol ester, a polyhydroxy-substituted paraffinic hydrocarbon, a polyhydroxy-substituted cycloparaffinic hydrocarbon, and a carbohydrate.

A more specific embodiment of the invention concerns a process for the manufacture of an N-substituted dodecyltolylthiocarbamic acid ester of a poly-(oxyethylene) glycol which comprises nitrating dodecyltoluene, reducing the resulting nitro-substituted dodecyltoluene to dodecyltoluidine, reacting said dodecyltoluidine with thio-carbonylchloride to form dodecyltolyl-thio-isocyanate and reacting said thio-isocyanate in the presence of a condensation catalyst consisting of pyridine with ethylene glycol and thereafter with ethylene oxide in an amount of ethylene oxide to form a polyoxyethylene chain containing from 10 to about 50 oxyethylene units in the chain.

Other objects and embodiments of the invention, more specifically setting forth the present process and its products will be referred to in greater detail in the following further description of the invention.

This invention is directed to N-(alkyl-substituted cyclic hydrocarbon)thio-urethan derivatives and particularly to such derivatives in which the cyclic hydrocarbon group is monocyclic aryl in structure, although certain alkyl derivatives of the polycyclic aromatic thio-urethans also have surface-active properties; the compounds generally designated herein as thio-urethans are intended to include both the benzenoid and naphthalene hydrocarbon derivatives, as well as the diphenyl derivatives. It is evident, however, that since the surface activity, and particularly its detergency, is dependent upon a proper balance between the effects of both the hydrophilic group (the water solubilizing thio-urethan substituent in the molecule) and the hydrophobic portion of the molecule (the alkylaryl hydrocarbon group), the number and chain length of the alkyl substituents on the cyclic hydrocarbon nucleus and the length of the ester radical required to arrive at a particular structure having optimum surface-activity will be different for the alkylphenyl thio-urethan derivatives than for the alkylpolycyclic hydrocarbon-substituted thio-urethans. In general, the most effective derivatives of the alkylphenyl series contain a single long chain alkyl substituent of from about 8 to about 20, and preferably from about 9 to about 15 carbon atoms per group, and not more than two additional alkyl groups of relatively short chain length containing not more than 3 carbon atoms per group. In the polycyclic hydrocarbon derivatives, the relatively long chain alkyl group preferably contains no more than about 12 and not less than about 3 carbon atoms per group. Some of the preferred starting materials for the present isocyanate intermediates comprise such alkylaryl hydrocarbons as octylbenzene, nonylbenzene, dodecylbenzene, pentadecylbenzene, octadecylbenzene, the corresponding ortho-, meta-, and paraoctyl-nonyl-, dodecyl-, pentadecyl-, and octadecyl-toluenes, -xylenes, -ethylbenzenes, -ethyltoluenes, and -isopropylbenzens of the mononuclear or phenyl series, and amyl-, amylmethyl-, amylethyl-, and methylpropyl-naphthalenes, hexyldiphenyl, and the like compounds of the polycyclic aryl hydrocarbon series. The thio-urethan compounds herein provided containing a phenyl nucleus, as distinguished from the polynuclear alkylaryl hydrocarbon analogs, are particularly preferred as general detergent and emulsifying agents in aqueous systems because of their greater solubility in water and higher softening point which probably results from the presence of fewer isomeric forms than are present in the case of the polynuclear derivatives.

In both the mono and polycyclic alkylaryl thio-urethan series, the compounds may also be optionally characterized as the thio-urethanyl phenylene derivative of the alkanes corresponding in chain length to the alkyl group; thus, for example, a polyoxyalkylene paradodecyltolyl thio-urethan may alternatively be designated as a thio-urethanyltolyldodecane, having the empirical structure represented by the following formula:

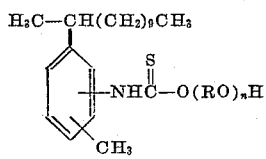

where R is a bivalent alkylene group containing from 2 to about 5 carbon atoms per group, and $n$ is a whole number having a value of from about 5 to about 150. Likewise, a polyoxyalkylene amylmethylnaphthylithiourethan may be optionally designated as methylthiourethanylnaphthylpentane, represented structurally as:

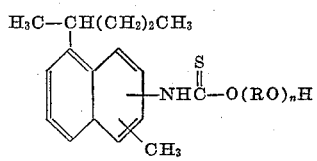

The alkyl aromatic hydrocarbons which form the structural basis upon which the hydrophilic thio-urethanyl substituents are appended and which in themselves constitute the hydrophobic portions of the surface-active thio-urethan products are formed by alkylation of the corresponding aromatic hydrocarbon with an alkylating agent having the chain length and structure of the desired long chain alkyl group. Suitable alkylating agents, the choice of which depends upon the chain length desired and the availability of the alkylating agent in the particular form for products of optimum detergency, may be selected from the relatively large number of organic compounds capable of reacting, in the presence of an acidic condensation catalyst to yield an alkyl group of the desired chain length capable of being transferred and becoming attached to the aryl nucleus of the aromatic hydrocarbon reactant in the system. Thus, for example, aliphatic alcohols, dialkyl ethers, aliphatic alcohol esters, mercaptans, alkyl halides, and particularly, olefinic hydrocarbons, either form alkyl radicals by fission of the alkylating agent at a point in the structure of the molecule which yields an alkyl residue as one of the fission products (as in the case of the esters, ethers, mercaptans, etc.), or upon contacting the catalyst, form reactive carbonium ions. Olefinic hydrocarbons of the desired chain length are preferred as alkylating agents, since these are readily available in commercial quantities in the chain lengths and structures generally desired to form detergents having optimum surface-activity. Although the method of forming alkyl aromatic hydrocarbons will be particularly directed herein toward the use of olefinic alkylating agents, it is to be emphasized that other classes of organic compounds as hereinabove specified, may likewise be effectively utilized to produce the starting material referred to as an alkyl aromatic hydrocarbon.

Olefinic alkylating agents of suitable chain length and structure may be obtained from various sources, one of the preferred being the olefinic polymers formed by polymerizing lower molecular weight olefins, such as ethylene, propylene, a butylene, etc. either thermally or in the presence of a polymerization catalyst, such as sulfuric or a phosphoric acid. Another source of the olefinic hydrocarbons suitable as alkylating agents to form the alkylaryl hydrocarbon starting materials in the present process includes appropriately boiling fractions of pressure distillates, separated from the products of thermally cracked petroleum charging stocks, such as gas oil fractions, topped crudes, etc. Still another source of suitable olefins are the dehydrohalogenation products of alkyl halides, the dehydration products of a suitable long chain alcohol, and synthetic olefins, such as olefins formed in Fischer-Tropsch syntheses.

In the production of an alkylbenzene starting material in which the long chain alkyl group desirably contains from about 8 to about 20 carbon atoms per group, and preferably from about 9 to about 15 carbon atoms, the preferred source of the alkylating agent for the preparation of the alkyl aromatic starting material is a propylene polymer containing the same number of carbon atoms per molecule as desired for the alkyl group of the ultimate product. One process widely used in the petroleum refining industry consists in passing a mixture of propane and propylene (which may also contain minor amounts of other paraffins, olefins or hydrogen) over a so-called "solid phosphoric acid catalyst" comprising a calcined composite of pyrophosphoric acid on kieselguhr (containing approximately 62% total $P_2O_5$) at a temperature of from about 300° to about 500° F., and susequently fractionating the resulting olefinic polymer product to recover a fraction having a boiling point corresponding to the molecular weight range of the olefin desired for alkylating the particular mono- or polynuclear aromatic hydrocarbon starting material. The preferred fraction for detergent production in which benzene to toluene is utilized as starting material for the preparation of the alkylate consists of hydrocarbons containing from about 9 to about 15 carbon atoms per molecule and boiling at normal pressure from about 140 to about 260° C. For detergent products requiring a longer chain alkyl group to develop optimum surface-activity, propylene polymer fractions having the particular molecular weight desired may be separated from the total polymer products by fractional distillation, preferably at subatmospheric pressure.

The preparation of the alkyl aromatic hydrocarbon starting material by the alkylation of an aromatic hydrocarbon with a long chain olefin is effected in a preliminary stage of the present process by contacting a mixture of the aromatic and olefinic hydrocarbons with a condensation catalyst, the proportion of aromatic and olefinic hydrocarbons in the reaction mixture being at least equimolecular, and preferably from about 1.5 mols of aromatic hydrocarbon per mol of olefinic alkylating agent to about 10 molar proportions thereof. Suitable alylating catalysts for the reaction are selected from the general group broadly characterized as acidic condensation catalysts which are charged to the process in catalyzing quantities, generally from about 0.1 to about 1.5 pounds of catalyst per pound of olefinic alkylating agent, depending upon the ease of condensation between the respective olefinic and aromatic reactants and the activity of the catalyst, which in turn depends upon the concentration of the active catalyzing component in the reagent utilized. The alkylation reactants and catalyst are contacted under mixing conditions sufficient to obtain an intimate dispersion of the catalyst and hydrocarbon reactants at temperatures of from about −30° to about 100° C., and preferably from about 0° to about 50° C. to obtain optimum alkylate production. Suitable condensation catalysts known generally in the art as acid-acting catalysts include, in general, such inorganic compounds as sulfuric acid containing not more than about 10% by weight of water, hydrofluoric acid containing not more than about 10% by weight of water, anhydrous aluminum bromide, and aluminum chloride, desirably in the presence of anhydrous hydrogen bromide or hydrogen chloride, resspectively, mixtures of hydrogen fluoride and boron trifluoride, and others, including the general group referred to as "Friedel Crafts" catalysts generally recognized as having catalytic activity in promoting hydrocarbon alkylation reactions. The hydrocarbon alkylate product separates as a distinct phase from the spent acid catalyst phase and may be subsequently separated into fractions representing alkylates preferred for particular detergent uses by fractional distillation (preferably at subatmospheric pressures). In the case of the benzene and toluene alkylates of dodecylene which, in general, are the preferred intermediate alkylates of this invention, the fraction desired for conversion to the thio-urethan detergent derivative boil thermally at from about 260° to about 345° C. The boiling range of other desired alkylates utilizable for detergent production generally vary in accordance with the particular nuclear aryl group and with the chain length of the alkyl substituent.

A procedure normally applicable to either the mono- or polycyclic alkyl aromatic hydrocarbon starting materials for the introduction of a thiourethan group having the empirical formula: —NHCSOR on the aryl nucleus of the alkylate comprises the following series of successive reaction steps: (1) subjecting the alkylaryl hydrocarbon to nitration under such conditions that a single nitro group is substituted on one of the nuclear aryl positions, (2) selectively reducing the nitro group of the resulting nitro alkylaryl hydrocarbon to form the corresponding amino-substituted alkylaryl compound, (3) reacting the latter amine with thio-phosgene (thiocarbonyl chloride) to form the corresponding alkylaryl isothiocyanate, or reacting the amine with carbon disulfide in the presence of powdered caustic, and hydrolyzing the product with hot hydrochloric acid; and (4) thereafter condensing the resulting isothiocyanate intermediate product with an organic polyoxy compound containing a replaceable hydrogen atom on at least one hydroxyl substituent present in the polyoxy compound to form the present thio-urethan surface-active agent which has the following empirical structure: $RR'_n$—Ar—NHCSOZ wherein Ar is a mono- or polynuclear aromatic polyvalent radical, $n$ is 0, 1, or 2, R is an alkyl group containing from 3 to about 20 carbon atoms per group, R' is an alkyl group containing from 1 to 2 carbon atoms per group, and Z is a monovalent polyoxy group. One of the preferred classes of thiourethan derivatives contemplated herein, formed by the the condensation of an alkylaryl isothiocyanate with a polyalkylene glycol, as representative of the polyoxy organic reactant specified herein, is depicted structurally by the empirical formula: $RR'_n$—Ar—$NHCSO(ZO)_mH$, wherein R, R', Ar, and $n$ have the values hereinabove specified for the products prepared from polyoxy organic compounds broadly, while Z in the latter formula is a bivalent alkylene group containing from 2 to 5 carbon atoms per group, and $m$ is a whole number having a value of from about 5 to about 150, and preferably, from about 10 to about 50. The optimum number and chain lengths of the alkyl substituents on the aryl nucleus vary in accordance with other characteristics of the product molecule, including the water-solubilizing ability of the hydrophilic group which in turn depends upon the molecular weight of the polyoxy organic reactant utilized in the condensation stage of the process to form the thiourethan product, the chain length of the alkylene group of the polyoxy reactant, if it is a polyoxyalkylene compound, and other factors in the molecular structure which mutually determine the detergency and solubility of the resulting product in aqueous or non-aqueous solvents.

The polyoxy organic compound containing an active hydrogen atom on one or more hydroxyl groups thereof, which compound when condensed with an alkylaryl isothiocyanate forms the thio-urethan product of this invention, may be selected from the relatively large number of polyoxyalkylene compounds of this class containing from 2 to about 5 carbon atoms per alkylene group and at least one hydroxyl group per molecule. Some of the general classes of compounds and specific exemplary members of such classes utilizable in the present process include the polyalkylene glycols of which the polyethylene glycols of molecular weights of from about 200 to about 10,000 (containing from 5 to about 225 oxyethylene units), preferably from about 300 to about 1500 molecular weight, represent one of the preferred species. Other poly-(oxyalkylene) glycols which form the present thiourethan derivative products are the polypropylene glycols having molecular weights of from about 200 to about 2,000, preferably from about 400 to about 1500, and the polybutylene and polyamylene glycols, preferably of molecular weights of from about 600 to about 3000. The mono-ethers and mono-esters of these poly-(oxyalkylene) glycols may also be used, the latter containing as ester or ether linkage on one of the terminal hydroxyl groups of the corresponding poly-(oxyalkylene) glycol. The polyalkylene glycol class of compounds may be represented by the empirical formula: $OH[C_mH_{2m}O]_nH$, wherein $m$ represents a small whole number having a value of from 2 to 5 inclusive and $n$, representing the number of oxyalkylene groups or units per molecule of glycol, has a value of from about 5 to about 150, preferably from about 10 to about 40.

Other polyoxy organic compounds utilizable in the present process by reaction with the alkylaryl isothiocyanate intermediate products to form the present surface-active agents include the polyols (that is, the polyhydroxy substituted aliphatic and cycloparaffinic hydrocarbons) in which the oxygen atoms present in the structure of the polyol compounds appear exclusively as hydroxyl groups. Typical specific members of the polyol reactants contemplated, include inositol, pentaerythritol, the various polyvinyl alcohols within the above range of molecular weights, arabitol, xylitol, adonitol, mannitol, dulcitol and sorbitol.

Still another group of organic polyhydroxy compounds capable of undergoing condensation with the alkylaryl isothiocyanate intermediate of the present process consists of polyhydroxy compounds in which all of the oxygen atoms do not appear exclusively in the compound as hydroxyl groups, but instead, some appear as ether, ketone, aldehyde, or ester linkages. Such compounds include the intermolecular condensation products of other polyhydric alcohols containing an ether linkage, such as, polypentaerythritol, polyinositol, polysorbitol, and others; the mono and polysaccharides of both the pentose and hexose series and their polymers which structurally represent polyhydroxy organic compounds containing a carbonyl group of either ketonic or aldehydic structure, such as glucose, sucrose, mannose, the polyhexose carbohydrates, such as, starch, etc.; and the polyhydroxy alcohol esters containing at least one free hydroxyl group such as the various organic acid esters of the polyethylene glycols, and compounds of like structure.

The condensation of the present alkylaryl isothiocyanate intermediate product with a polyoxy organic compound, is effected at a reaction temperature of from about 50° to about 200° C., preferably from about 80° to about 150° C., and, in the case of certain less readily reacted polyoxy organic compounds, in the presence of a catalytic agent characterized as an organic nitrogen or inorganic base. When a rapid reaction rate is desired for the condensation of any polyoxy organic compounds or when the individual reactants do not readily undergo condensation, certain organic nitrogen bases as well as certain inorganic alkaline compounds accelerate the rate of reaction or effect reaction of the individual reactants substantially to completion. The reaction rate and completion of the reaction is also promoted by the exclusion of moisture from the reaction mixture, such as the moisture introduced by partially hydrated reactants or catalyst. It is also desirable in many instances to effect the condensation reaction in the presence of a solvent for one or more of the reactants and catalyst, the solvent being generally selected from the alcohol esters, such as ethylacetate, hydrocarbons, preferably aromatic hydrocarbons, such as benzene, toluene, etc., chlorohydrocarbons, such as ethylene dichloride, chlorobenzene, etc. and ethers, such as dibutyl ether, diamylether, etc., preferably those compounds having a boiling point corresponding to the desired reaction temperature. In many instances, in order to obtain the desired reaction temperature above the boiling point of the solvent, it is advisable to conduct the condensation reaction at a superatmospheric pressure sufficient to maintain the solvent and reactants in substantially liquid phase.

The organic nitrogen bases which act as catalytic agents in the present condensation reaction are characterized as compounds within the above classification which are alkaline in aqueous solution, that is, they have pH's greater than 7. The organic nitrogen bases utilizable as catalysts in the present condensation reaction are further characterized in that they have no active hydrogen atom substituted directly on the nitrogen atom elsewhere in the organic base which, if present, would undergo condensation with the alkylaryl isothiocyanate reactant to partially remove the latter reactant charged into the condensation reaction mixture. The catalysts are thus selected from the tertiary amines and the quaternary ammonium bases, including such compounds as triethyl amine, tripropylamine, tributylamine, di-isobutylmethylamine, di-isoamylmethylamine, pyridine, N-methyl piperidine, quinoline, dimethylbenzylamine, diethylbenzylamine, and others. The preferred organic bases usable as catalysts in the condensation reaction are the cyclic nitrogen compounds, such as pyridine, N-methylpiperidine, and quinoline. Other suitable catalytic agents include the alkaline inorganic bases such as sodium carbonate, potassium carbonate, sodium and potassium alkanolates, such as sodium methanolate, potassium ethanolate, sodium phenolate, and others of the alkali metal carbonates, phosphates and alcoholates. The catalyst is added to the reaction mixture in an amount of from about 0.1 to about 20 weights per weight of alkylaryl isothiocyanate charged to the reaction mixture. The catalyst may generally be removed from the subsequent product by solvent extraction or by distillation or evaporation therefrom.

A thio-urethan product prepared by the condensation of a polyoxy organic compound with an alkylaryl isothiocyanate may contain one or more free hydroxyl groups (depending upon the reactants chosen and on the molecular ratio of reactants) which may be further esterified with a carboxylic acid or etherified with another alcohol condensable therewith, preferably of relatively short chain length, to form the corresponding ester or ether, respectively. The latter may be the preferred form of the final product for reasons of modified solubility in water or organic solvents or because of the more pronounced mucilaginous or soap like qualities of the resulting product, not necessarily characteristic of the thiourethan product containing free hydroxyl groups. Typical instances of such products are the acetylated thiourethans formed by the condensation of an alkylaryl isothiocyanate with a mono- or di-acetylated polyol, such as inositol monoacetate or acetylated polyinositol. The acetylation reaction is generally effected by reacting the thio-urethan compound with acetylchloride under acetylating conditions, or it may be conducted on the polyol prior to reaction of the latter with the alkylarylisothiocyanate.

The thio-urethan condensation products of the present process vary in physical properties, particularly melting points, depending upon the chain length and degree of branching of the alkyl group of the alkylaryl isothiocyanate, and more particularly upon the molecular weight of the polyoxy reactant utilized in the condensation thereof with the alkylaryl isothiocyanate intermediate. In the case of the low molecular weight glycols, and polyoxyalkylene compounds such as the mono- and poly-saccharides, and polyethylene glycols containing up to about 9 oxyethylene units, the resulting product is generally a viscous liquid which is insoluble in water. As the molecular weight of the polyols utilized in the condensation reaction increases to values of intermediate range, the products tend to be pasty solids which form a milky emulsion in water, particularly in hot water. The higher molecular weight polyols form condensation products with alkylaryl isothiocyanates which exist in the form of waxy solids and are soluble in water at all temperatures when the number of water-solubilizing oxy- or hydroxy groups is sufficient. The latter materials are mucilaginous when dissolved in water, having many of the desirable physical properties of fatty acid soaps such as their characteristic feel to human skin.

The products form nonionic-micelles in aqueous solution and are compatible in admixture with cationic, anionic and other nonionic detergents. They may be composited with other types of detergents either in liquid or solid form and are thus particularly desirable for the manufacture of detergents in bar form, either individually or in admixture with an anionic, cationic or other nonionic detergents. Amounts of the thio-urethan detergent varying from about 1 to about 50% by weight of the composition have been found particularly advantageous. Builder salts, such as sodium sulfate, sodium polyphosphates, sodium silicate, and others well known in the art as well as extenders, abrasives, perfumes, water-softening compounds may also be composited with the present product to enhance its detergent and cleansing properties or its customer appeal.

It is to be noted particularly that the water solubility of the thio-urethan products of the present invention is directly proportional to the number of water-solubilizing groups present in the polyoxy reactant utilized in the condensation reaction. The water solubility of the condensation product is more particularly dependent upon the number of carbon atoms comprising the hydrophobic hydrocarbon skeleton relative to the number of water-solubilizing oxy or hydroxy groups in the polyoxy reactant. Thus, a polyoxy compound having a high carbon-to-oxygen ratio is relatively insoluble in water and produces thio-urethan products of low solubility in water but relatively greater solubility in oils and other organic solvents; thus, such products have little utility as water-soluble detergents, although the same compounds are generally relatively soluble in organic solvents and may be utilized as detergents in nonaqueous systems, such as the detergent component of a lubricating oil or cutting oil composition, or as an emulsifying agent. On the other hand, a polyoxy compound in which the carbon-to-oxygen ratio is relatively small is generally readily soluble in water and produces water-soluble thio-urethan products, and when the chain length of the hydrophilic group attached to the thio-urethan radical is of sufficient length and contains a sufficient number of such water-solubilizing groups, the resulting thio-urethan compound is an effective aqueous detergent. It is therefore generally preferred, when water-soluble detergents are the desired product of the condensation reaction, to prepare the thio-urethan product from "polymeric" short chain alkylene glycols or polyalkylene glycols in which the alkylene group contains relatively few carbon atoms, generally up to about 5 per alkylene group. When the final thio-urethan product is desired as a detergent component in a nonaqueous system, the polyhydroxy or polyoxy reactant is preferably a compound in which the carbon skeleton contains a comparatively large number of carbon atoms relative to each water-solubilizing hydroxyl or oxy group, or the hydrophilic reactant is limited to compounds of relatively low molecular weight to restrict the number of water-solubilizing groups introduced into the resultant condensation product and promote its solubility in nonaqueous systems.

In some instances it becomes desirable to convert a water-insoluble thio-urethan condensation product to a water-soluble product and in such instances any free hydroxyl groups which did not enter into the condensation reaction with the alkylaryl isothiocyanate reactant may be converted to derivative salts or esters to promote the water-solubility of the resultant condensation product. Thus, in the case of condensation products containing free hydroxyl groups, the latter may be converted into more water-soluble derivatives by reaction with sulfuric acid to form a sulfate ester which may be used as such in an aqueous system or converted to the corresponding sodium salt thereof to form a substantially neutral anionic detergent product. Likewise, a water-soluble thio-urethan condensation product may be converted to a water-insoluble material by converting the free hydroxyl groups of the thio-urethan product to the corresponding ester or ether derivatives of strongly hydrophobic compounds.

The present invention is further illustrated with respect to specific embodiments thereof in the following examples. In thus describing specific illustrations of the invention it is not thereby intended to limit the generally broad scope of the invention in strict accordance therewith.

EXAMPLE I

I. *Alkylation of aromatic hydrocarbons*

A series of alkyltoluene hydrocarbons was prepared to provide the initial starting material in the production of alkylaryl isothiocyanates from which a variety of thio-urethan derivatives were prepared by the procedure hereinafter described. The alkyltoluenes in which the alkyl group is hexyl, nonyl and dodecyl were prepared by alkylating toluene in the presence of an acidic condensation catalyst with olefinic propylene polymer fractions containing, respectively, a predominant proportion of hexylene, nonylene, and dodecylene as the corresponding alkylating agents. The following procedure describes the method of preparing the respective alkyltoluene hydrocarbons:

(A) *Hexyltoluene.*—840 cc. of 98.5% sulfuric acid was charged to a 5 liter alkylating flask fitted with a mechanical stirrer and cooled to about 5° C. 828 grams (9 mols) of toluene was cooled to 5° C. and added to the sulfuric acid, followed by a solution of 504 grams (6 mols) of the hexylene fraction of a propylene polymer in 828 grams (9 mols) of toluene. The hexylene alkylating agent was a fraction having a boiling point of from 69 to 70° C., a specific gravity of 0.6900, and a bromine number of 70 and was separated by the fractional distillation of a mixture of propylene polymers formed by polymerizing a mixture of propylene and propane over a solid phosphoric acid catalyst (a calcined composite of pyro-phosphoric acid and kieselguhr containing about 62% $P_2O_5$). The solution of hexylene in toluene was added to the mixture of toluene and sulfuric acid catalyst over a period of 3 hours, accompanied by vigorous stirring of the resulting two phases. The mixture was then allowed to settle, resulting in the separation of 2 layers, an upper hydrocarbon layer and a lower predominantly sulfuric acid layer which was drawn off and discarded. The upper hydrocarbon layer was washed with water and aqueous alkali, dried over calcium chloride, and thereafter fractionally distilled to separate 230 grams of a fraction having a boiling point of 230 to 235° C. and a refractive index of 1.4935. Analysis of this fraction for $C_{13}H_{20}$ gave the following analytical results compared with the calculated analysis for carbon and hydrogen:

Analysis:
  Calculated for $C_{13}H_{20}$: C, 88.63; H, 11.37%.
  Found: C, 88.85; H, 11.41%.

The 230–235° boiling range fraction had a specific gravity of 0.8675 and a molecular refraction of 59.06, as compared with the theoretical value of 58.63 for hexyltoluene.

(B) *Nonyltoluene.*—750 grams (8.15 mols) of toluene was charged to a 5-liter alkylating flask fitted with a mechanical stirrer, two dropping funnels and a cooling bath which reduced the temperature of the toluene to 5° C. 630 grams (6.85 mols) of toluene and 630 grams (5 mols) of the nonylene fraction of a propylene polymer product (boiling point at 760 mm. Hg pressure: 130 to 145° C.) were mixed, cooled to 5° C. and charged into one of the dropping funnels. 800 cc. of cooled, 98.5% sulfuric acid was charged to the other dropping funnel and the two materials thereafter simultaneously introduced into the alkylating flask where the mixture was efficiently stirred at a temperature of approximately 5° C. over a period of 3 hours. Upon settling, the reaction mixture separated into two layers and the lower acid layer was decanted and discarded. The upper hydrocarbon layer was washed with water and sodium bicarbonate, dried and subjected to fractional distillation. The fraction having a boiling range of from about 270° to about 280° C. was separated for segregation as the nonyltoluene product, the fraction having the indicated boiling range weighing 846 grams.

(C) *Dodecyltoluene.*—This alkylate was prepared in a manner similar to that described for the preparation of nonyltoluene, except that a dodecylene fraction, comprising the 170–225° C. fraction of a propylene polymerization product was utilized in the alkylation reaction with toluene in the presence of sulfuric acid having a concentration of 98.5%. The dodecyltoluene product was separated as the fraction of the hydrocarbon product of the reaction having a boiling range of from about 275 to about 325° C.

II. Preparation of alkylaryl isothiocyanate derivatives of alkyltoluene hydrocarbons (A) *Mono-nitrononyltoluene.*—In the case of each of the above toluene alkylates, that is, hexyltoluene, and nonyltoluene, and dodecyltoluene, the isothiocyanate derivatives thereof were prepared in accordance with a uniform procedure for each alkylate involving initially nitrating the alkyltoluene, reducing the nitro group of the product to the corresponding alkyltoluidines, and reacting the latter product with thiophosgene (thiocarbonyl chloride) to introduce the isothiocyanate group. Since a similar procedure was utilized to prepare the isothiocyanate derivatives for each of the toluene alkylates, the basic method involved will be described for nonyltolyl isothiocyanate, the method being repeated as to its basic procedure for the preparation of the other toluene alkylates.

A mixture of 181 grams of concentrated nitric acid (specific gravity 1.42) and 280 grams of 98.5% sulfuric acid was cooled to 10° C. and then added dropwise over a period of three hours with efficient stirring to 327 grams (1.50 moles) of nonyltoluene contained in a 1-liter reaction vessel placed in a cooling bath consisting of a mixture of salt and ice, which controlled the reaction temperature during this period at approximately 32–35° C. The cooling bath was then removed and the heat of reaction raised the temperature to 50° C. where it was maintained an additional two hours, accompanied by stirring.

After cooling, the organic layer was separated from the acid layer, diluted with an equal volume of pentane, washed with water and sodium bicarbonate and dried over calcium chloride. The pentane solvent was removed by distillation at atmospheric pressure and the remaining high boiling material was fractionally distilled at a pressure of 2–3 mm. Hg absolute. The fraction boiling from 143 to 148° C. at 2 mm. pressure having a refractive index of 1.5175 was separated, weighing 302 grams. Analysis of this fraction for nitrogen and comparison of the result with the theoretical nitrogen content for the pure compound resulted in the following data:

Nitrogen analysis:
  Calculated for $C_{16}H_{25}NO_2$: N, 5.32%.
  Found: N, 5.25%.

(B) *Nonyltoluidine.*—The procedure employed for the reduction of the nitro group of mono-nitrotoluene was substantially similar to the procedure employed for reduction of the nitro group of the corresponding mono-nitrohexyltoluene and mono-nitrododecyltoluene derivatives. The reduction of mono-nitrononyltoluene was effected in accordance with the following procedure: 300 grams (1.14 mols) of mononitrononyltoluene, dissolved in 200 cc. of absolute ethanol, was charged with 30 grams of nickel-kieselguhr hydrogenation catalyst into a 3-liter pressure autoclave containing a glass liner, sealed, and pressured to 100 atmospheres of hydrogen. The bomb was rotated at 25° C. for 7 hours during which time the pressure was substantially constant. Following the above reduction period, the batch was removed, the catalyst filtered from the liquid product and the solvent separated from the hydrogenation product by distillation at atmospheric pressure. The higher boiling bottoms material was fractionated at a pressure of about 2–3 mm. Hg absolute pressure. A fraction boiling from 123 to 128° C. at 2 mm. Hg pressure was collected from the overhead distillate. Its refractive index was 1.5220, its specific gravity was 0.0294 and the product yield was 96.5% of theoretical. The product had an observed molecular refraction of 76.7, compared with the theoretical value for nonyltoluidine of 76.8. Analysis of the product compared with the calculated nitrogen content give the following results:

Nitrogen analysis:
  Calculated for $C_{16}H_{27}N$: N, 6.01%.
  Found: N, 6.01%.

III. Preparation of alkylaryl isothiocyanates

The following procedure for the preparation of nonyltolyl isothiocyanate from nonyltoluidine is substantially the same as that employed for the preparation of the corresponding hexyl- and dodecyltolyl isothiocyanates utilizing the respective hexyl- and dodecyltoluidines as starting material. The procedure consisted essentially of reacting the alkyltoluidine with thiophosgene (thiocarbonyl chloride) and thereafter fractionally distilling the product to separate the desired alkylaryl isothiocyanate product.

(A) *Nonyltolyl isothiocyanate.*—175 grams (0.750 mol) of nonyltoluidine is introduced into a stirred, 3-liter flask, followed by the addition thereto of 87 grams (0.75 mole) of thiophosgene added dropwise to the nonyltoluidine over a period of one hour. The product was distilled at 2 mm. Hg absolute pressure and fractions of the product were collected. A theoretical yield of approximately 92% was distilled from the reaction mixture as the nonyltolyl isothiocyanate product.

IV. Preparation of alkylaryl thio-urethan derivatives of polyoxy organic compounds (A) *Thio-urethan derivatives formed by the condensation of hexyltolyl isothiocyanate with polyalkylene glycols.*—A series of thio-urethan type compounds may be prepared by the condensation of hexyltolyl isothiocyanate (prepared as indicated above for nonyltolyl isothiocyanate) with a number of ethylene glycol polymers having molecular weights of from about 200 to about 6000, represented by the formula:

$$H(OCH_2CH_2)_nOH$$

wherein $n$, representing the number of oxyethylene units per molecule of the glycol, has a value of from about 4 to about 136. A solution of 14 grams (0.03 mol) of polyethylene glycol having an average molecular weight of approximately 460 and 60 cc. of pyridine is placed in a reaction vessel containing a motor driven stirrer and a distillation column. The mixture is then subjected to distillation until 15 cc. of pyridine has distilled over to completely dry the mixture. A reflux condenser is then substituted for the distillation column and 7.0 grams (0.03 mol) of hexyltolyl isothiocyanate, prepared as indicated above, and 15 cc. of toluene are then added dropwise to the refluxing solution of polyethylene glycol under efficient stirring conditions. The hexyltolyl isothiocyanate solution in toluene is added to the refluxing solution of polyethylene glycol over a period of 1.5 hours, and after an additional two hours of refluxing, the reaction mixture is distilled under vacuum to remove the pyridine and toluene solvent. The absolute pressure is then reduced to 2 mm. Hg, the distillation flask heated on a water bath for one hour at the above reduced pressure to completely remove the last traces of pyridine, and the residue in the distillation flask removed as the thio-urethan product, consisting of 18.6 grams. The product, free of pyridine, is a bright yellow viscous syrup, soluble in water.

Thio-urethan derivatives of hexyltolyl isothiocyanate utilizing polyethylene glycols having average molecular weights of from about 200 to about 6000 may also be prepared by procedures similar to the method hereinabove described employing polyethylene glycol of molecular weight about 460. The reactions produce substantially quantitative yields of the thio-urethan products which are readily soluble in water.

In each instance, when the product is tested for its efficiency as a detergent in accordance with standard Launder-O-Meter testing procedures (1), and the rating of the detersive efficiency of the product compared with that of a commercial sodium alkylaryl sulfonate detergent composition in various aqueous concentrations the results are designated in the following Table I:

TABLE I.—DETERGENCIES OF BUILT THIO-URETHA DETERGENT COMPOSITIONS COMPARED WITH ALKYL ARYLSULFONATE IN STANDARD WASHING TESTS [1]

| Organic Detergent Concentration in Wash solution, wt. percent | 0.05 | 0.1 | 0.2 | 0.3 |
|---|---|---|---|---|
| Na₂SO₄ Builder Concentration in Wash Solution, wt. percent | 0.075 | 0.15 | 0.3 | 0.45 |
| | Percent Detersive Efficiency [2] of Thio-urethan Compared with Alkylarylsulfonate | | | |
| Average Molecular Weight of Polyethylene Glycol in Thio-urethan: | | | | |
| 200 | 30 | 20 | 25 | 30 |
| 400 | 40 | 45 | 60 | 55 |
| 600 | 75 | 70 | 80 | 80 |
| 1,000 | 95 | 90 | 85 | 80 |
| 1,540 | 95 | 75 | 80 | 75 |
| 4,000 | 50 | 55 | 55 | 60 |
| 6,000 | 45 | 40 | 45 | 50 |

[1] A standard Launder-O-Meter test consists in washing for 10 minutes cotton swatches soiled with a mixture of carbon black, mineral oil and tallow in the detergent solution at 140° F., in water having 300 p. p. m. hardness, the detergent action being promoted by agitating the wash mixture with the soiled swatches in the presence of steel balls. In order to provide uniformity, the procedure was similar for all samples.

[2] Percent efficiency =

Increase in reflectance of swatch after deterging in aqueous solution of sample

——————————————————————

Increase in reflectance of swatch after deterging in aqueous alkylarylsulfonate solution of same concentration The above data indicate that optimum detergent efficiency in the case of the thio-urethan derivatives prepared from hexyltolyl isothiocyanate is obtained in the condensation products with polyethylene glycols having molecular weights of from about 600 to about 4000, and particularly about 1000 to about 2000, and maximum efficiency of each sample is obtained at relatively low concentrations of the detergent in aqueous solution.

(B) *Thio-urethan derivatives prepared from nonyltolyl isothiocyanates.*—Nonyltolylthio-urethan derivatives may be prepared from polyethylene glycols having average molecular weights of from about 200 to about 6000 in accordance with the same procedure hereinabove described for the preparation of the thio-urethan derivatives of hexyltolyl isothiocyanate with polyethylene glycols. The physical form of the thio-urethan products varied from viscous liquids for thio-urethans prepared from glycols having average molecular weights of 200, 400 and 600 to waxy solids for thio-urethans of glycols having average molecular weights of 1000, 1540, 4000 and 6000. Only the product of the polyethylene glycols having an average molecular weight of 200 was relatively insoluble (to the extent of 0.1 weight percent in aqueous solution) in water, and hence was unsuitable for use as an aqueous detergent. The product in this instance, however, is soluble in organic solvents such as hydrocarbon oils, and therefore can be utilized as a non-aqueous detergent. The following Table II presents data relating to washing tests utilizing the thio-urethan detergents which may be prepared from nonyltolyl isothiocyanate and compares the detergency thereof when built to a detergent composition containing sodium sulfate as the builder salt with an alkylarylsulfonate.

TABLE II.—DETERGENCIES OF BUILT THIO-URETHAN DETERGENT COMPOSITIONS COMPARED WITH ALKYL ARYLSULFONATE IN STANDARD WASHING TESTS [1]

| Organic Detergent Concentration in Wash Solution, Wt. Percent | 0.05 | 0.1 | 0.2 | 0.3 |
|---|---|---|---|---|
| Na₂SO₄ Builder Salt Concentration in Wash Solution, Wt. Percent | 0.075 | 0.15 | 0.3 | 0.45 |
| | Percent Detersive Efficiency [2] of Thio-urethan Compared with Alkylarylsulfonate | | | |
| Average Molecular Weight of Polyethylene Glycol in Thio-urethan: | | | | |
| 200 | | | | |
| 400 | 70 | 50 | 35 | 25 |
| 600 | 140 | 110 | 105 | 110 |
| 1,000 | 115 | 90 | 100 | 90 |
| 1,540 | 110 | 90 | 95 | 95 |
| 4,000 | 65 | 55 | 65 | 70 |
| 6,000 | 60 | 50 | 60 | 60 |

[1] See footnote (1) of Example (A), above.
[2] See footnote (2) of Example (A), above.

The above data indicate that thio-urethan detergent products prepared from nonyltolyl isothiocyanate with polyethylene glycols of varying molecular weights have optimum detergent efficiency when the polyethylene glycol reactant has a molecular weight of from about 400 to about 4000 and particularly from about 500 to about 2000. The product is most efficient at low concentrations in aqueous solution, although even at higher concentrations, up to about 0.3 weight percent, some of the thio-urethan products are more efficient as detergents than the alkylarylsulfonate.

(C) *Thio-urethan derivatives of dodecyltolyl isothiocyanate.*—In the preparation of these products, dodecyl isothiocyanate is reacted with various polyethylene glycols varying in molecular weights from about 150 to about 6000 in accordance with the procedure hereinabove described for the condensation of hexyltolyl isothiocyanate with polyethylene glycols to form the resulting thio-urethan derivatives. The products varied in physical form from syrupy liquids, in the case of the thio-urethan prepared from polyethylene glycols averaging in molecular weights from about 150 to about 200 inclusive, to highly viscous liquids for thio-urethan derivatives prepared from polyethylene glycols whose molecular weights were 400 and 600, to waxy solids for thio-urethan derivatives prepared from polyethylene glycols whose molecular weights were 1000, 1540, 4000 and 6000. All products of the dodecyl series were readily soluble in water, except for the syrupy product prepared from the polyethylene glycol polymer having an average molecular weight of about 150 and 200. The following Table III presents the results of washing tests utilizing a detergent composition containing the thio-urethan derivatives prepared from dodecyltolyl isothiocyanate, built with anhydrous sodium sulfate in the concentrations designated, as compared with alkylarylsulfonate compositions containing sodium sulfate at equivalent concentration and in a similar test procedure:

TABLE III

TABLE III.—DETERGENCY OF BUILT THIO-URETHAN DETERGENT COMPOSITIONS COMPARED WITH ALKYL ARYLSULFONATE IN STANDARD WASHING TESTS [1]

| Organic Detergent Concentration in Wash Solution, Wt. Percent | 0.05 | 0.10 | 0.20 | 0.30 |
|---|---|---|---|---|
| Na₂SO₄ Builder Salt Concentration in Wash Solution, Wt. Percent | 0.075 | 0.15 | 0.30 | 0.45 |
| | Percent Detersive Efficiency [2] Compared With Alkylarylsulfonate | | | |
| Average Molecular Weight of Polyethylene Glycol in Thio-urethan: | | | | |
| 150 | | | | |
| 200 | | | | |
| 400 | 75 | 60 | 50 | 40 |
| 600 | 170 | 135 | 95 | 85 |
| 1,000 | 130 | 110 | 110 | 105 |
| 1,540 | 115 | 110 | 95 | 105 |
| 4,000 | 75 | 70 | 65 | 70 |
| 6,000 | 55 | 50 | 50 | 50 |

[1] See footnote (1) of (A), above.  [2] See footnote (2) of (a), above.

The above data indicate that of the thio-urethan detergents prepared from alkyltolyl isothiocyanates and polyethylene glycols, the series prepared from the dodecyl alkyl derivative, as compared to the hexyl and nonyl derivatives, have maximum detergencies as a class which are optimum when the average molecular weight of the polyethylene glycol reactant is from about 400 to about 6000, and particularly from about 500 to about 2000. The results further indicate that the detergents are most effective in relatively dilute aqueous solutions, although even at higher concentrations the product is more effective than the alkylarylsulfonate at equivalent concentrations.

Further wash tests on the hexyl-, nonyl-, and dodecyltolyl-polyoxyethylene thio-urethans showed that the effect of the sodium sulfate builder on the detergency was relatively minor as compared with its effect on the alkylarylsulfonate, and that equal detergency could be obtained with much smaller amounts of unbuilt thiourethans than from a built alkylarylsulfonate.

EXAMPLE II

The effect of including a nitrogenous organic base as a catalyst in the preparation of an alkylaryl isothiocyanate with an hydroxyl compound is indicated in the following comparative experiments. 32 grams (0.1 mol) of dodecyltolyl isothiocyanate is refluxed with 46 grams (1 mol) of absolute ethanol for 30 minutes and the extent of the condensation which takes place between these reactants is noted by the percentage of recovery of ethanol from the reaction mixture. Upon distillation of the reaction mixture after 30 minutes of reflux, 43.5 grams of ethanol are recovered, indicating that approximately 50% of the isothiocyanate undergoes condensation with the ethanol. The alcohol, when returned to the reaction mixture and again refluxed for an additional 3.5 hours, yields a product from which 41 grams of ethanol may be recovered by distillation. The resulting thio-urethan is a viscous syrup which is insoluble in water.

In contrast with the above non-catalyzed reaction mixture, a second mixture of 32 grams of dodecyltolyl isothiocyanate (0.1 mol), 46 grams (1 mol) of absolute ethanol, and 5 grams of pyridine is prepared at room temperature which reacts spontaneously. After standing for 30 minutes, the mixture may be subjected to distillation and the original 5 grams of pyridine and 41 grams of ethanol recovered, leaving a residue consisting of a viscous syrup, insoluble in water, which is substantially the same product as recovered in the prior reaction.

EXAMPLE III

Thio-urethan derivatives prepared by the condensation of alkylaryl isothiocyanates with carbohydrates (A) *Condensation of dodecyltolyl isothiocyanate with sucrose.*—6 grams (0.018 mol) of powdered sucrose, previously dried at 110° C. for one hour, and 5.2 grams (0.016 mol) of dodecyltolyl isothiocyanate are placed in a reaction vessel and stirred at 105° C. for 36 hours. The product when recovered from the reaction mixture, weighs 5.8 grams and is identified as sucrose; no substantial amount of reaction takes place after 36 hours of heating at the above temperature conditions.

The catalytic effect of a nitrogenous organic base is again indicated in the following run, in which the above attempted condensation is effected in the presence of pyridine as a catalyst and solvent. 17.1 grams (0.05 mol) of dried and powdered sucrose is placed in a reaction flask equipped with a reflux column. 200 cc. of pyridine is introduced, the sucrose dissolving therein by refluxing at the boiling point of the pyridine. 90 cc. of pyridine is then distilled over to insure a completely anhydrous system, the sucrose remaining dissolved in the residual pyridine. 15.9 grams (0.05 mol) of dodecyltolyl isothiocyanate is then added dropwise to the boiling sucrose solution in pyridine over a period of one hour. Heating is continued an additional three hours, followed by removal of the pyridine therefrom by distillation at atmospheric pressure until the liquid temperature attains a value of 120° C. The remaining pyridine is completely removed by heating the remaining mixture under vacuum on a steam bath. To remove any possible unreacted sugar, 20 grams of the product is dissolved in 25 cc. of diethyl ether and extracted 5 times with 5 cc. portions of water. The water extract phase is evaporated to dryness and is identified as unreacted sucrose. The ether solution is dried over anhydrous calcium sulfate and the solvent removed by distillation. A light yellow, solid powder is left, weighing 22 grams. Analysis of the powder for nitrogen indicates that it contains approximately the theoretical content of nitrogen for $C_{12}H_{22}O_{11} \cdot C_{19}H_{31}NCS$.

(B) *Condensation of dodecyltolyl isothiocyanate with glucose.*—Dry, powdered glucose is mixed with pyridine and the mixture heated at the refluxing temperature of the pyridine while dodecyltolyl isothiocyanate is introduced dropwise into the mixture accompanied by vigorous stirring, in the manner described for part A (above). The resulting white solid product is insoluble in water and its nitrogen analysis indicates that the product corresponds to the formula: $C_6H_{12}O_6 \cdot C_{19}H_{31}NCS$.

EXAMPLE IV

Thio-urethan derivatives prepared by condensation of alkylaryl isothiocyanates with polyhydroxyalkanes (A) *Condensation of dodecyltolyl isothiocyanote with pentaerythritol.*—Pentaerythritol (6.8 grams or 0.05 mole) is placed in the flask of a reflux distillation apparatus with 150 cc. of dried pyridine, followed by addition of 16 grams (0.05 mole) of dodecyltolyl isothiocyanate added dropwise over a period of one hour. The reaction mixture is refluxed at the boiling point of the pyridine for an additional six hours, followed by removal of the pyridine therefrom, first at atmospheric pressure, then by distillation at 2 mm. Hg pressure, the latter distillation removing the last traces of pyridine from the reaction mixture. The residue is purified of its pentaerythritol content by dissolving the residue in diethyl ether and extraction of the ether solution by 5 aliquots of water. The extracted ether solution is thereafter dried over calcium sulfate and evaporated to dryness, leaving a yellow solid substantially insoluble in water but soluble in petroleum ether having a weight corresponding approximately to the theoretical yield of $C_5H_{12}O_4 \cdot C_{19}H_{31}NCS$. This material has some emulsifying properties.

We claim as our invention:

1. An alkylaryl hydrocarbon N-substituted mono-thio-urethan having the empirical formula:

$$R(R')_n-Ar-NHCSOZ$$

wherein Ar is a polyvalent aryl hydrocarbon nucleus selected from the group consisting of the mono- and bicyclic aryl hydrocarbons, n is a numeral selected from the group consisting of 0, 1, and 2, R is an alkyl group containing from 3 to about 20 carbon atoms, R' is an alkyl group containing from 1 to 2 carbon atoms, and Z is a monovalent radical of a member selected from the group consisting of a poly-(oxyalkylene) glycol, a poly-(oxyalkylene) glycol ether, a poly-(oxyalkylene) glycol ester, a polyhydroxy-substituted paraffinic hydrocarbon, a polyhydroxy-substituted cycloparaffinic hydrocarbon, and a carbohydrate.

2. A compound as defined in claim 1 further characterized in that Ar is a benzene ring.

3. An alkylaryl hydrocarbon N-substituted mono-thiourethan having the empirical formula:

$$R(R')_n-Ar-NHCSO(ZO)_mH$$

wherein Ar is a polyvalent aryl hydrocarbon nucleus selected from the group consisting of the mono- and bicyclic aryl hydrocarbons, n is a numeral selected from the group consisting of 0, 1 and 2, R is an alkyl group containing from 3 to about 20 carbon atoms, R' is an alkyl group containing from 1 to 2 carbon atoms, Z is a bivalent alkylene group containing from 2 to 5 carbon atoms, and m is a whole number having a value of from about 5 to about 150.

4. A compound as defined in claim 3 further characterized in that Ar is a benzene ring.

5. An N-(octyltolyl)mono-thiocarbamic acid ester of a polyoxy organic compound selected from the group consisting of a poly-(oxyalkylene) glycol, a poly-(oxyalkylene) glycol ether, a poly-(oxyalkylene) ester, a polyhydroxy-substituted paraffinic hydrocarbon, a polyhydroxy-substituted cycloparaffinic hydrocarbon and a carbohydrate.

6. An N-(nonyltolyl) mono-thiocarbamic acid ester of a polyoxy organic compound selected from the group consisting of a poly-(oxyalkylene) glycol, a poly-(oxyalkylene) glycol ether, a poly-(oxyalkylene) glycol ester, a polyhydroxy-substituted paraffinic hydrocarbon, a polyhydroxy-substituted cycloparaffinic hydrocarbon, and a carbohydrate.

7. An N-(dodecyltolyl) mono-thiocarbamic acid ester of a polyoxy organic compound selected from the group consisting of a poly-(oxyalkylene) glycol, a poly-(oxyalkylene) glycol ether, a poly-(oxyalkylene) glycol ester, a polyhydroxy-substituted paraffinic hydrocarbon, a polyhydroxy-substituted cycloparaffinic hydrocarbon and a carbohydrate.

8. A process for the production of an alkylaryl monothio-urethan which comprises reacting compound (1) with compound (2), said compound (1) consisting of: a mono-(alkylaryl)-substituted isothiocyanate in which said alkylaryl radical is substituted on the isothiocyanate nitrogen atom of said isothiocyanate and is selected from the group consisting of mono- and bicyclic aryl hydrocarbon radicals containing an alkyl substituent on the aryl nucleus having from 3 to about 20 carbon atoms, and said compound (2) is a polyoxy organic compound selected from the group consisting of a poly-(oxyalkylene) glycol, a poly-(oxyalkylene) glycol ether, a poly-(oxyalkylene) glycol ester, a polyhydroxy-substituted paraffinic hydrocarbon, a polyhydroxy-substituted cycloparaffinic hydrocarbon, and a carbohydrate.

9. A process for the production of an alkylaryl monothio-urethan which comprises reacting compound (1) with compound (2), said compound (1) consisting of an alkylbenzene isothiocyanate in which the alkyl benzene radical is substituted on the isothiocyanate nitrogen atom of said isothiocyanate and contains a nuclear alkyl substituent having from 8 to about 20 carbon atoms, and compound (2) is a polyoxy organic compound selected from the group consisting of a poly-(oxyalkylene) glycol, a poly-(oxyalkylene) glcol ether, a poly-(oxyalkylene) glycol ester, a polyhydroxy-substituted paraffinic hydrocarbon, a polyhydroxy-substituted cycloparaffinic hydrocarbon, and a carbohydrate.

10. The process of claim 8 further characterized in that said alkylaryl isothiocyanate is reacted with said polyoxy organic compound in the presence of an organic nitrogen base containing a tertiary substituted nitrogen atom in an amount of from about 0.1 to about 20 weights of said alkylaryl isothiocyanate.

11. The process of claim 10 further characterized in that said organic nitrogen base is pyridine.

12. The process of claim 10 further characterized in that said alkylaryl isothiocyanate is reacted with said polyoxy organic compound at a temperature of from about 30° to about 150° C.

13. The process of claim 8 further characterized in that said polyoxy compound is a polyethylene glycol containing an average of from about 5 to about 150 oxyethylene groups per molecule.

14. The process of claim 8 further characterized in that said polyoxy compound is a polyethylene glycol containing an average of from about 10 to about 50 oxyethylene groups per molecule.

15. The process of claim 9 further characterized in that said polyoxy compound is a polyethylene glycol containing an average of from about 5 to about 150 oxyethylene groups per molecule.

16. The process of claim 9 further characterized in that said polyoxy compound is a polyethylene glycol containing an average of from about 10 to about 50 oxyethylene groups per molecule.

17. The process of claim 9 further characterized in that said alkylbenzene isothiocyanate is nonyltolyl isothiocyanate.

18. The process of claim 9 further characterized in that said alkylbenzene isothiocyanate is dodecyltolyl isothiocyanate.

References Cited in the file of this patent

UNITED STATES PATENTS

| | | |
|---|---|---|
| 1,970,578 | Schoeller et al. | Aug. 21, 1934 |
| 2,374,136 | Rothrock | Apr. 17, 1945 |

OTHER REFERENCES

Bost et al.: Jour. Am. Chem. Soc., vol 65, pp. 900–901 (1943).